(12) United States Patent
Nishino et al.

(10) Patent No.: US 10,194,107 B2
(45) Date of Patent: Jan. 29, 2019

(54) SOLID-STATE IMAGING APPARATUS AND DRIVING METHOD OF SOLID-STATE IMAGING APPARATUS

(71) Applicant: SONY CORPORATION, Tokyo (JP)

(72) Inventors: Tatsuki Nishino, Kanagawa (JP); Yosuke Ueno, Kanagawa (JP); Yusuke Ikeda, Tokyo (JP); Yusuke Moriyama, Kanagawa (JP); Shizunori Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/566,343

(22) PCT Filed: Apr. 13, 2016

(86) PCT No.: PCT/JP2016/061934
§ 371 (c)(1),
(2) Date: Oct. 13, 2017

(87) PCT Pub. No.: WO2016/185839
PCT Pub. Date: Nov. 24, 2016

(65) Prior Publication Data
US 2018/0084211 A1    Mar. 22, 2018

(30) Foreign Application Priority Data

May 20, 2015   (JP) ................................. 2015-102643

(51) Int. Cl.
*H04N 5/369*   (2011.01)
*H04N 5/357*   (2011.01)
(Continued)

(52) U.S. Cl.
CPC ........... *H04N 5/3698* (2013.01); *H04N 5/357* (2013.01); *H04N 5/374* (2013.01); *H04N 5/378* (2013.01)

(58) Field of Classification Search
CPC ...... H04N 5/3698; H04N 5/357; H04N 5/378; H04N 5/374
See application file for complete search history.

(56) References Cited

U.S. PATENT DOCUMENTS 7,075,474 B2 * 7/2006 Yamagata ........... H03M 1/0619
341/155
8,981,987 B2 * 3/2015 Hashimoto ............ H04N 5/378
341/155

(Continued)

FOREIGN PATENT DOCUMENTS

JP   2006-20172 A    1/2006
JP   2009-290658 A  12/2009

(Continued)

OTHER PUBLICATIONS

International Search Report prepared by the Japan Patent Office on May 6, 2016, for International Application No. PCT/JP2016/061934.

*Primary Examiner* — Padma Haliyur
(74) *Attorney, Agent, or Firm* — Sheridan Ross P.C.

(57) ABSTRACT

To reduce fluctuations in image signals when the voltage of a negative power supply supplied to pixels changes. A pixel operates based on a first ground potential applied to a first ground line and outputs an analog image signal according to emitted light. An analog-digital converter operates based on a second ground potential applied to a second ground line, the second ground potential higher than the first ground potential, and converts the analog image signal into a digital image signal based on a reference voltage as a standard for the conversion. A reference voltage generation unit operates based on the second ground potential and generates the reference voltage. A reference voltage correction unit corrects the reference voltage generated according to a change (Continued)

in the first ground potential and supplies the reference voltage to the analog-digital converter.

8 Claims, 14 Drawing Sheets

(51) Int. Cl.
*H04N 5/374* (2011.01)
*H04N 5/378* (2011.01)

(56) References Cited

U.S. PATENT DOCUMENTS

| | | |
|---|---|---|
| 9,166,614 B2 * | 10/2015 | Higuchi ................. H04N 5/378 |
| 2006/0001564 A1 | 1/2006 | Yamagata et al. |
| 2011/0062310 A1 | 3/2011 | Kudo |
| 2014/0240565 A1 | 8/2014 | Murakami |
| 2015/0109506 A1 | 4/2015 | Aibara et al. |
| 2017/0064225 A1 * | 3/2017 | Yamazaki ............. H04N 5/357 |

FOREIGN PATENT DOCUMENTS

| | | |
|---|---|---|
| JP | 2014-165396 A | 9/2014 |
| JP | 2015-80132 A | 4/2015 |

* cited by examiner

F I G . 1
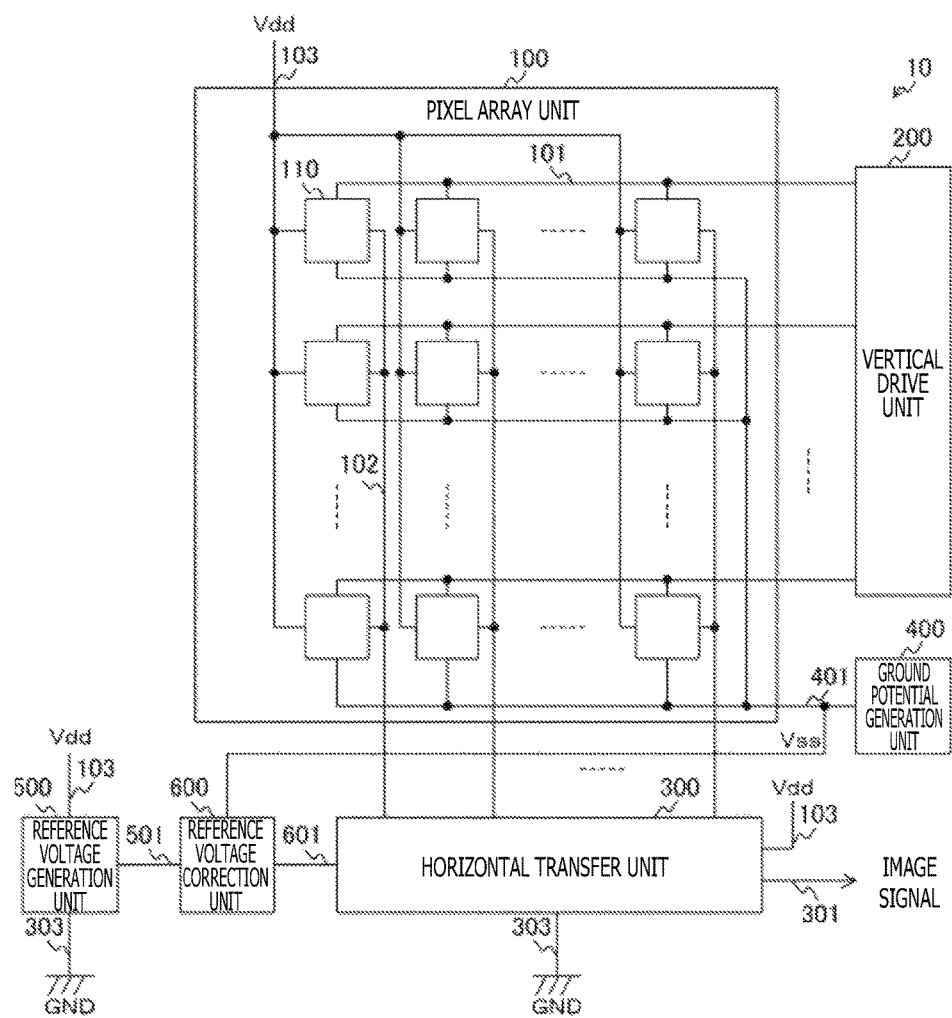

F I G. 5
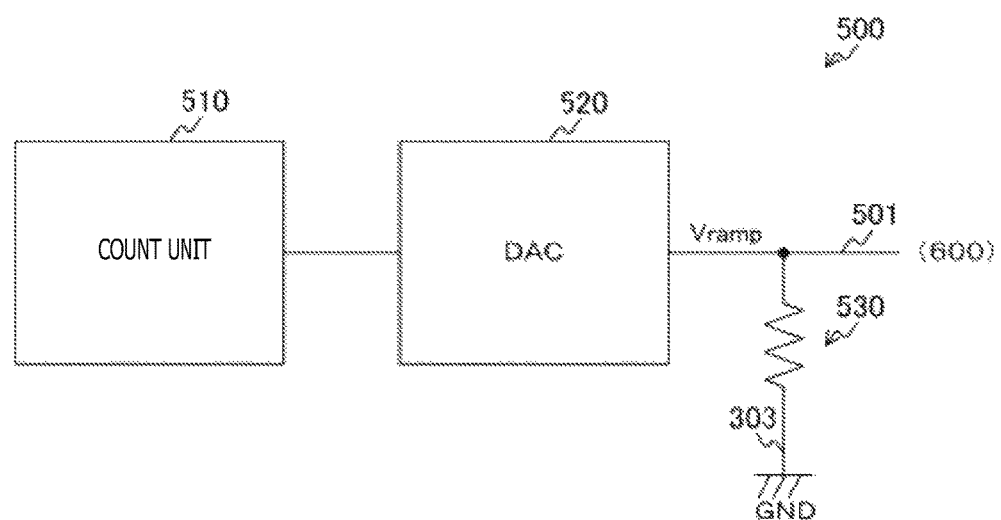

F I G . 7
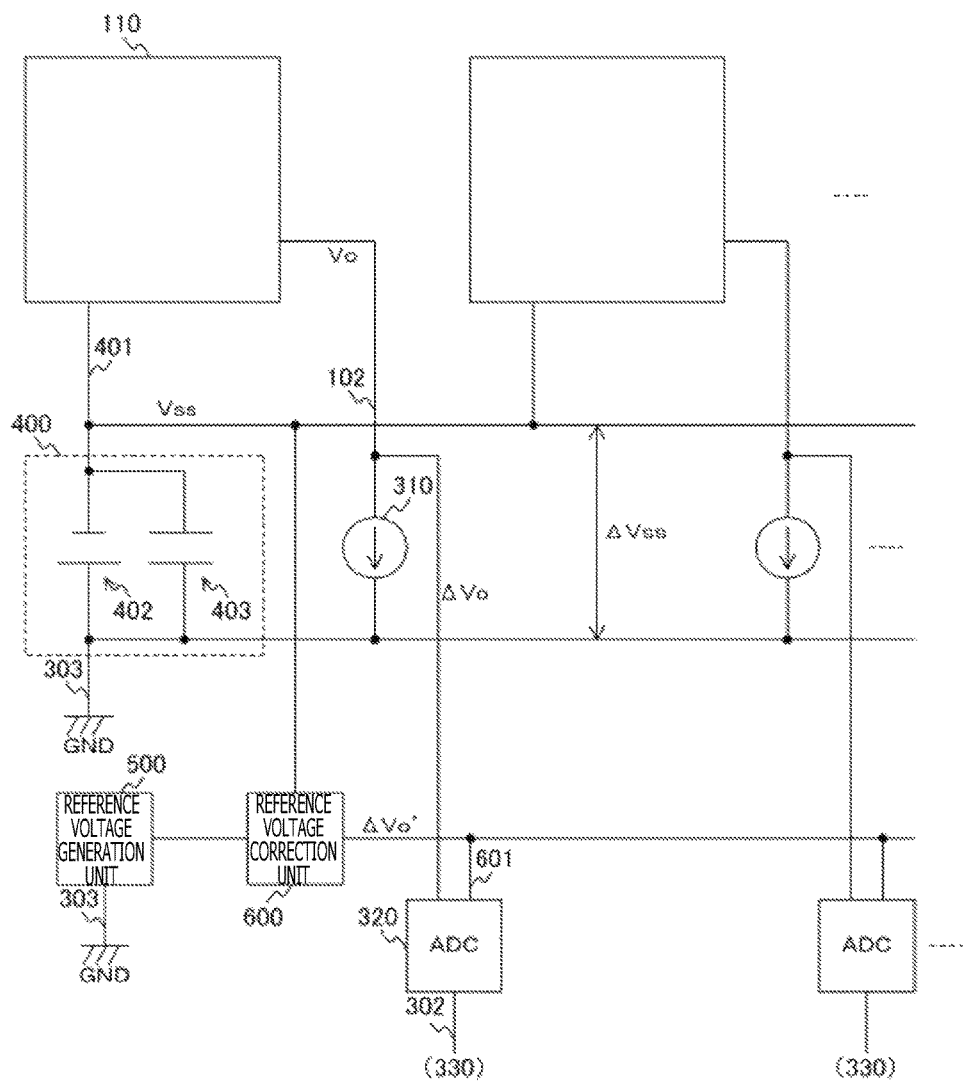

F I G . 1 0
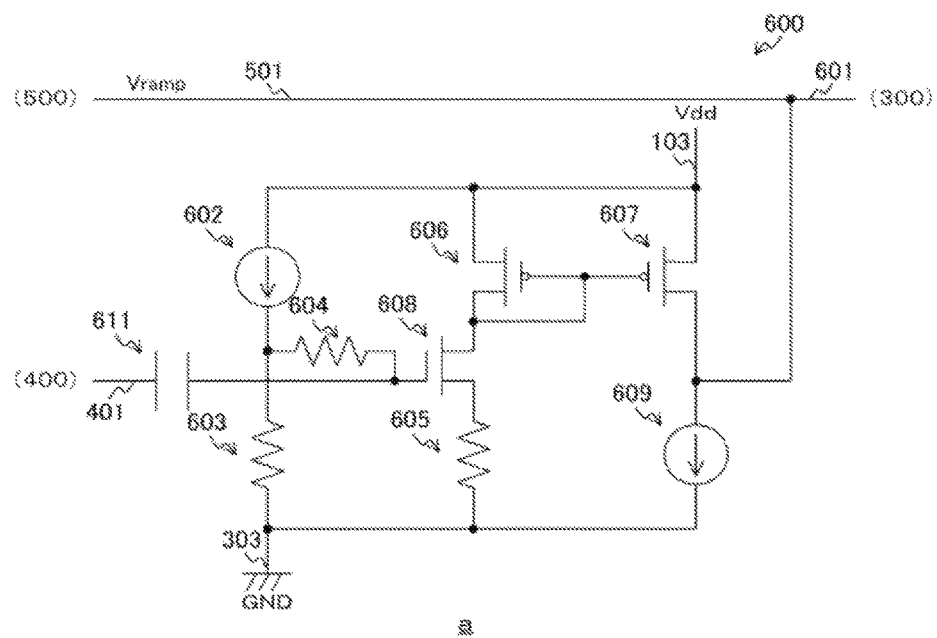
a
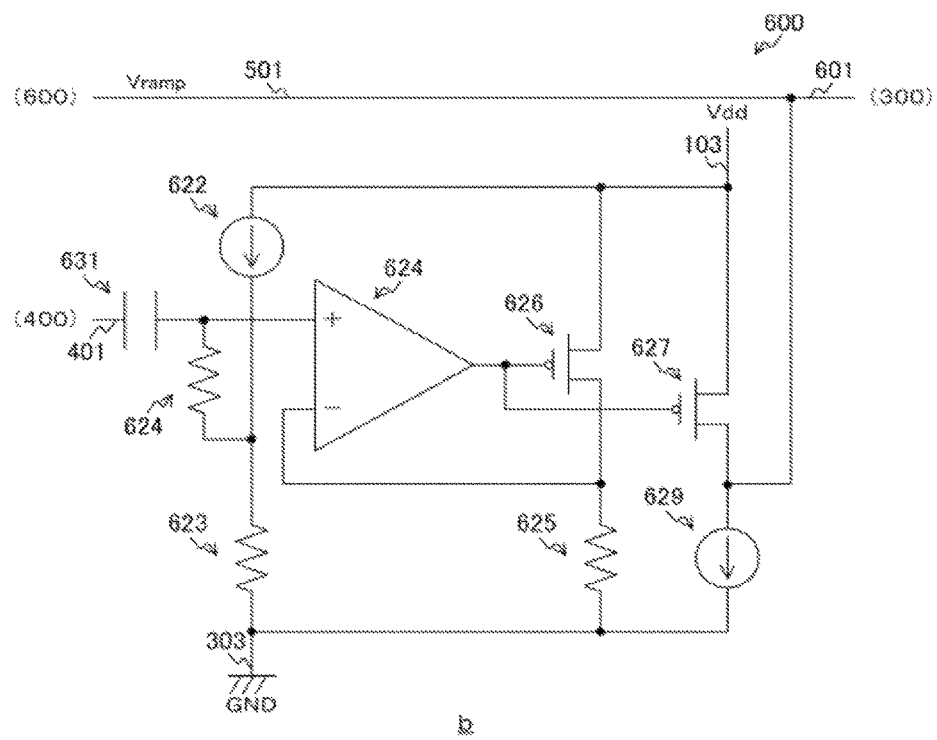
b

F I G . 1 4
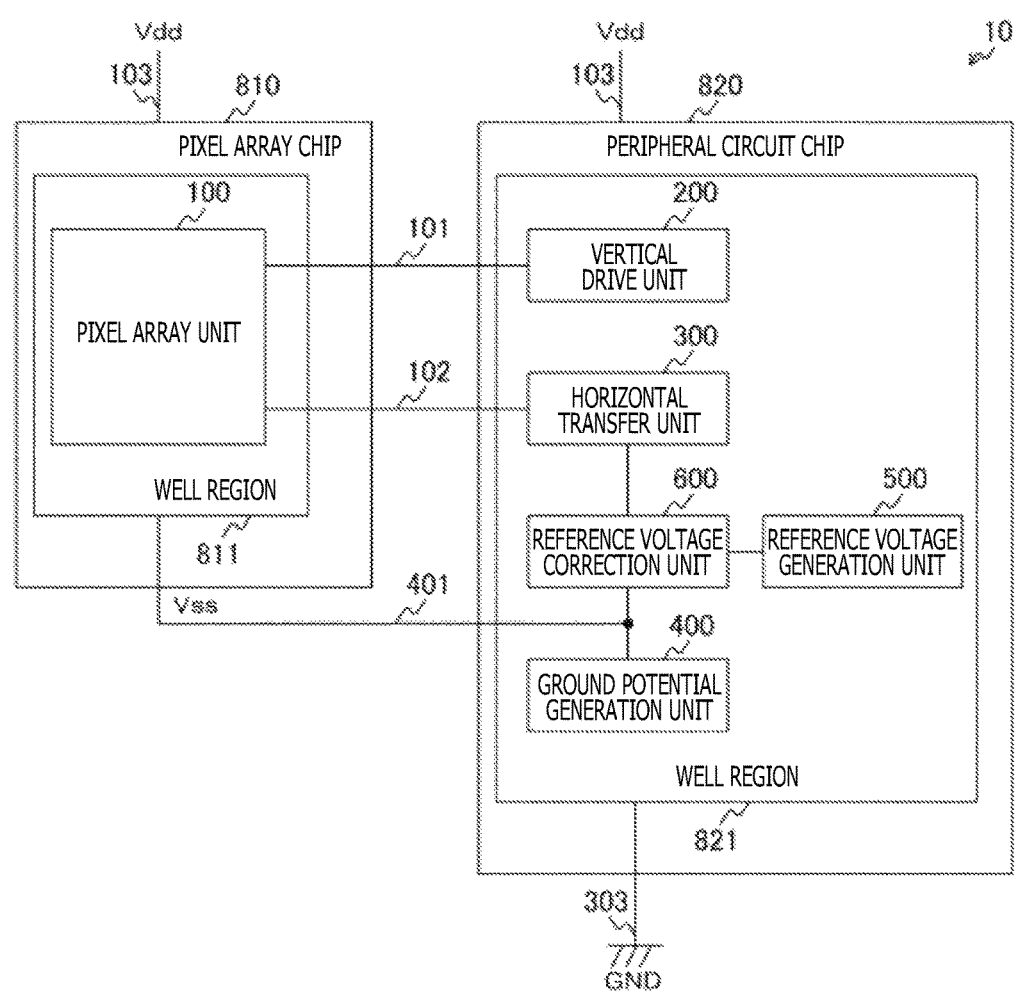

SOLID-STATE IMAGING APPARATUS AND DRIVING METHOD OF SOLID-STATE IMAGING APPARATUS

CROSS REFERENCE TO RELATED APPLICATIONS

This application is a national stage application under 35 U.S.C. 371 and claims the benefit of PCT Application No. PCT/JP2016/061934 having an international filing date of 13 Apr. 2016, which designated the United States, which PCT application claimed the benefit of Japanese Patent Application No. 2015-102643 filed 20 May 2015, the disclosures of which are incorporated herein by reference in their entirety.

TECHNICAL FIELD

The present technique relates to a solid-state imaging apparatus and a driving method of a solid-state imaging apparatus. Particularly, the present technique relates to a solid-state imaging apparatus that applies, to pixels configured to generate image signals, a ground potential lower than a ground potential of peripheral circuits configured to drive the pixels and relates to a driving method in the solid-state imaging apparatus.

BACKGROUND ART

In the past, a complementary metal-oxide semiconductor (CMOS) imaging apparatus has been used as an imaging apparatus used in a camera or the like. The imaging apparatus includes pixels including photoelectric conversion elements that generate image signals according to emitted light, and peripheral circuits that drive the pixels. In recent years, the voltage of a power supply is lowered to reduce the power consumption of a camera or the like, and there is also a growing demand for lowering the voltage in the imaging apparatus. However, when the power supply voltage of the pixels drops, the dynamic range of the photoelectric conversion elements becomes narrow, and there is a problem that the imaging apparatus is easily affected by noise. Accordingly, a system is proposed, in which a negative power supply voltage is applied to the pixels in addition to the related positive power supply voltage to thereby extend the dynamic range to reduce the effect of the noise (for example, see PTL 1).

CITATION LIST

Patent Literature

[PTL 1]
JP 2009-117613 A

SUMMARY

Technical Problem

The related technique described above requires a negative power supply that supplies the negative power supply voltage. The negative power supply includes a switching regulator that converts a positive power supply supplied to the imaging apparatus into a negative power supply voltage, and the negative power supply is formed as a local regulator in the imaging apparatus. When the output voltage of the negative power supply changes due to a load fluctuation or the like, image signals generated by the pixels fluctuate, and there is a problem that the quality of the image is reduced.

The present technique has been made in view of the circumstances, and an object of the present technique is to reduce fluctuations in image signals when the voltage of a negative power supply supplied to pixels changes.

Solution to Problem

The present technique has been made to solve the above-described problem, and a first aspect of the present technique provides a solid-state imaging apparatus including a pixel, an analog-digital converter, a reference voltage generation unit, and a reference voltage correction unit. The pixel operates based on a first ground potential applied to a first ground line and outputs an analog image signal according to emitted light. The analog-digital converter operates based on a second ground potential applied to a second ground line, the second ground potential higher than the first ground potential, and converts the analog image signal into a digital image signal based on a reference voltage as a standard for the conversion. The reference voltage generation unit operates based on the second ground potential and generates the reference voltage. The reference voltage correction unit corrects the generated reference voltage according to a change in the first ground potential and supplies the reference voltage to the analog-digital converter. As a result, the reference voltage is corrected according to the change in the first ground potential.

In the first aspect, the solid-state imaging apparatus may further include a ground potential generation unit that generates the first ground potential and applies the first ground potential to the first ground line. As a result, the ground potential generation unit generates the first ground potential.

In the first aspect, the solid-state imaging apparatus may further include a ground potential control unit that stops the operation of generating the first ground potential by the reference voltage generation unit during the conversion by the analog-digital converter. As a result, the operation of generating the first ground potential is stopped during the analog-digital conversion.

In the first aspect, the analog-digital converter may include a comparison unit that compares the analog image signal and the reference voltage to detect coincidence between the analog image signal and the reference voltage, and a count unit that performs counting in a period from a start of the comparison to the detection by the comparison unit and that outputs a count value as the digital image signal. As a result, the analog-digital converter is constituted by the comparison unit and the count unit.

In the first aspect, a same power supply voltage may be applied to the pixel and the analog-digital converter. As a result, a common power supply voltage is set for the pixel and the analog-digital converter.

In the first aspect, the solid-state imaging apparatus may further include a plurality of the pixels arranged in a matrix, and a plurality of the analog-digital converters that individually convert the analog image signals output from the plurality of pixels arranged in one row. The reference voltage correction unit may supply the same corrected reference voltage to each of the plurality of analog-digital converters. As a result, the common reference voltage is set for the plurality of analog-digital converters.

In the first aspect, a semiconductor chip provided with the pixel and a semiconductor chip provided with the analog-digital converter and the reference voltage generation unit may be different, and the first ground potential may be applied to a well region of the semiconductor chip provided with the pixel. As a result, the first ground potential is applied to the well region of the semiconductor chip provided with the pixel.

A second aspect of the present technique provides a driving method of a solid-state imaging apparatus, the method including an image signal output procedure, an analog-digital conversion procedure, a reference voltage generation procedure, and a reference voltage correction procedure. The image signal output procedure operates based on a first ground potential applied to a first ground line and outputs an analog image signal according to emitted light. The analog-digital conversion procedure operates based on a second ground potential applied to a second ground line, the second ground potential higher than the first ground potential, and converts the analog image signal into a digital image signal based on a reference voltage as a standard for the conversion. The reference voltage generation procedure operates based on the second ground potential and generates the reference voltage. The reference voltage correction procedure corrects the generated reference voltage according to a change in the first ground potential and supplies the reference voltage to an analog-digital converter. As a result, the reference voltage is corrected according to the change in the first ground potential.

Advantageous Effect of Invention

The present technique can have an excellent advantageous effect of reducing fluctuations of image signals when the voltage of a negative power supply supplied to pixels changes. Note that the advantageous effect described here may not be limited, and the present technique may have any of the advantageous effects described in the present disclosure.

BRIEF DESCRIPTION OF DRAWINGS

FIG. 1 is a diagram depicting a configuration example of a solid-state imaging apparatus according to a first embodiment of the present technique.

FIG. 5 is a diagram depicting a configuration example of a reference voltage generation unit 500 according to the first embodiment of the present technique.

FIG. 7 is a diagram depicting a change in a low ground potential according to the first embodiment of the present technique.

FIG. 10 depicts diagrams illustrating a reference voltage correction unit 600 according to the first embodiment of the present technique.

FIG. 14 is a diagram depicting a configuration example of a solid-state imaging apparatus 10 according to a third embodiment of the present technique.

DESCRIPTION OF EMBODIMENTS

Figure 2:
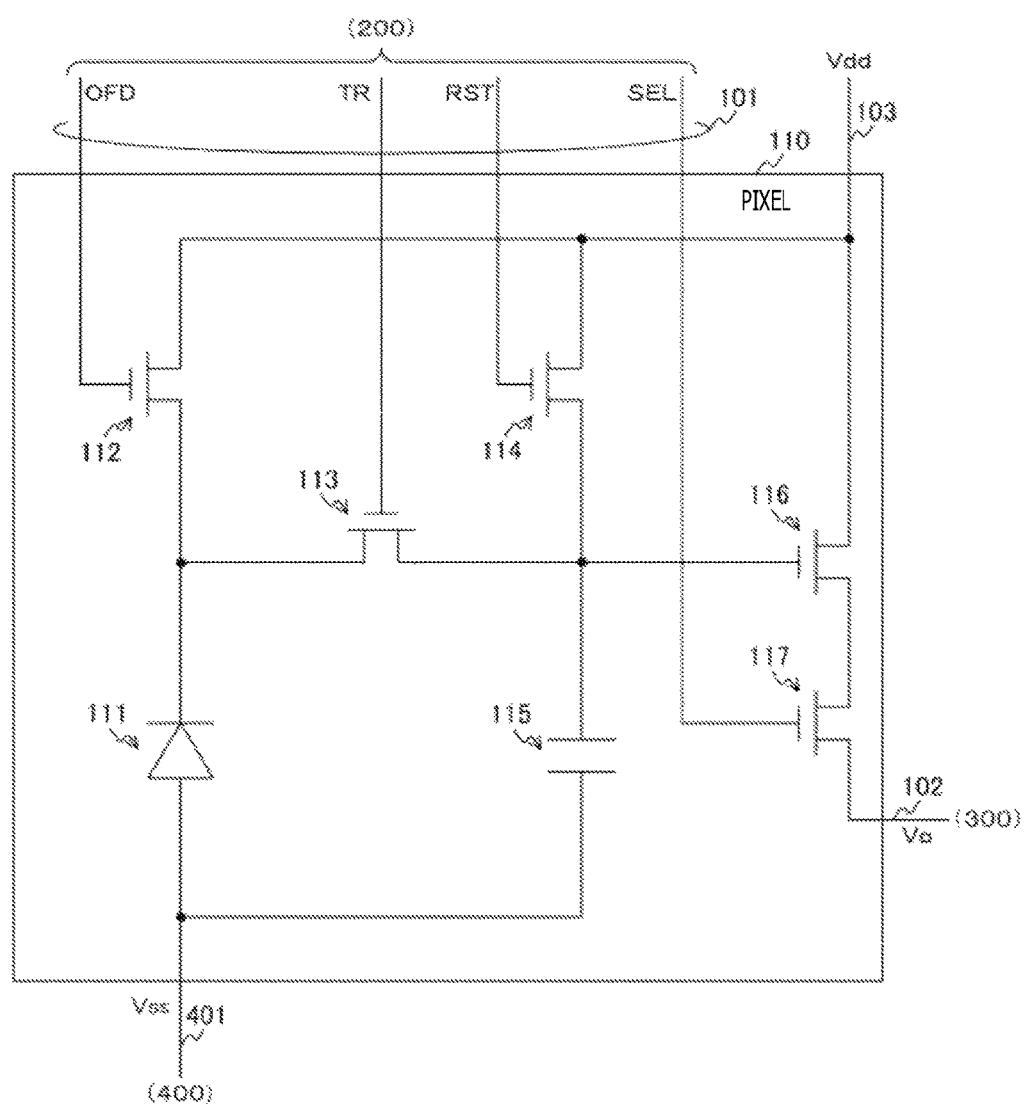
FIG. 2 is a diagram depicting a configuration example of a pixel 110 according to the first embodiment of the present technique.

Hereinafter, modes for carrying out the present technique (hereinafter, referred to as embodiments) will be described. The description is in the following order.

1. First embodiment (example of constant operation of ground potential generation unit)
2. Second embodiment (example of intermittent operation of ground potential generation unit)
3. Third embodiment (example of connecting first ground line to well region provided with pixel array unit)

1. First Embodiment

Configuration of Solid-State Imaging Apparatus

FIG. 1 is a diagram depicting a configuration example of a solid-state imaging apparatus 10 according to a first embodiment of the present technique. The solid-state imaging apparatus 10 includes a pixel array unit 100, a vertical drive unit 200, a horizontal transfer unit 300, a ground potential generation unit 400, a reference voltage generation unit 500, and a reference voltage correction unit 600.

In the pixel array unit 100, pixels 110 that generate image signals are arranged in a matrix. In the pixel array unit 100, signal lines 101 for transmitting control signals to the pixels 110 and signal lines 102 for transmitting image signals generated by the pixels 110 are wired in an XY matrix. More specifically, one common signal line 101 is wired to the pixels 110 arranged in the same row, and outputs of the pixels 110 arranged in the same column are wired to one common signal line 102. A power supply voltage Vdd as a power supply voltage necessary for the operation of the pixel array is applied to the pixel array unit 100 through a signal line 103. Furthermore, the pixel array unit 100 is grounded to a low ground potential Vss through a first ground line 401. That is, the pixel array unit 100 operates based on the low ground potential Vss. Here, the low ground potential Vss is a potential lower than a ground potential GND of the horizontal transfer unit 300 and the like described later. Here, it is assumed that the ground potential GND is 0 V. It is assumed that the power supply voltage Vdd is, for example, 2.7 V. It is assumed that the low ground potential Vss is, for example, −0.9 V. Note that the low ground potential Vss is an example of the first ground potential described in the claims. The ground potential GND is an example of the second ground potential described in the claims.

The horizontal transfer unit 300 is configured to process image signals output from the pixel array unit 100. The process is equivalent to analog-digital conversion (AD conversion) of image signals and the like described later. Output signals corresponding to the pixels 110 of one row of the pixel array unit 100 are simultaneously input to the horizontal transfer unit 300. The horizontal transfer unit 300 applies signal processing to the input image signals and then transfers the image signals in a horizontal direction to output the image signals to a signal line 301. The image signals output from the horizontal transfer unit 300 are supplied to the outside of the solid-state imaging apparatus 10. Furthermore, a reference voltage that is a voltage as a standard in the AD conversion is input from the reference voltage correction unit 600 described later through a signal line 601. Details of the process by the horizontal transfer unit 300 will be described later. Furthermore, the power supply voltage Vdd is applied to the horizontal transfer unit 300 through the signal line 103, and the horizontal transfer unit 300 is grounded to the ground potential GND through a second ground line 303.

The vertical drive unit 200 is configured to generate control signals and output the control signals to the pixel array unit 100. The vertical drive unit 200 outputs the control signals to the signal lines 101 corresponding to all rows of the pixel array unit 100. The control signals of the vertical drive unit 200 include signal output for controlling the start and stop of exposure in the pixels 110 of the pixel array unit 100 and signal output for controlling reading of image signals from the pixels 110 obtained by the exposure. Note that, like the horizontal transfer unit 300, the power supply voltage Vdd is applied to the vertical drive unit 200 through the signal line 103, and the vertical drive unit 200 is grounded to the ground potential GND through the second ground line 303.

The reference voltage generation unit 500 is configured to generate a reference voltage necessary for the process by the horizontal transfer unit 300 and output the reference voltage to a signal line 501. Details of the reference voltage generation unit 500 will be described later. Like the horizontal transfer unit 300, the power supply voltage Vdd is applied to the reference voltage generation unit 500 through the signal line 103, and the reference voltage generation unit 500 is grounded to the ground potential GND through the second ground line 303.

The reference voltage correction unit 600 is configured to correct the reference voltage input from the signal line 501 and to output the reference voltage to the signal line 601. Details of the reference voltage correction unit 600 will be described later.

The ground potential generation unit 400 is configured to generate the low ground potential Vss described above. A switching regulator that converts the power supply voltage Vdd applied as the power supply voltage into the low ground potential Vss can be used for the ground potential generation unit 400, for example.

Circuit Configuration of Pixel

FIG. 2 is a diagram depicting a configuration example of the pixel 110 according to the first embodiment of the present technique. The pixel 110 includes a photoelectric conversion unit 111, a charge transfer unit 113, a charge holding unit 115, a charge discharging unit 114, an amplification unit 116, a selection unit 117, and an overflow drain 112. Note that the overflow drain 112, the charge transfer unit 113, the charge discharging unit 114, the amplification unit 116, and the selection unit 117 are constituted by N-channel metal-oxide semiconductor (MOS) transistors.

The signal lines 101 and 102 are connected to the pixel 110. The signal lines 101 include a plurality of signal lines (OFD, TR, RST, and SEL). An overflow drain control signal line OFD (Over Flow Drain) is a signal line for transmitting a control signal to the overflow drain 112. A transfer signal line TR (Transfer) is a signal line for transmitting a control signal to the charge transfer unit 113. A reset signal line RST (Reset) is a signal line for transmitting a control signal to the charge discharging unit 114. A select signal line SEL (Select) is a signal line for transmitting a control signal to the selection unit 117. As depicted in FIG. 2, the signal lines are connected to the gates of the MOS transistors. When a voltage equal to or greater than a threshold voltage between the gate and the source (hereinafter, referred to as ON signal) is input through the signal lines, the corresponding MOS transistor is electrically connected. In addition, an output signal Vo is output to the signal line 102.

Furthermore, the power supply voltage Vdd is applied to the pixel 110 through the signal line 103, and the pixel 110 is grounded to the low ground potential Vss through the first ground line 303.

As depicted in FIG. 2, the anode of the photoelectric conversion unit 111 is connected to the first ground line 401, and the cathode is connected to the source of the charge transfer unit 113 and the source of the overflow drain 112. The gate and the drain of the overflow drain 112 are connected to the OFD and the signal line 103, respectively. The drain of the charge transfer unit 113 is connected to the source of the charge discharging unit 114, the gate of the amplification unit 116, and one end of the charge holding unit 115. The other end of the charge holding unit 115 is connected to the first ground line 401. The gate of the charge transfer unit 113 is connected to the TR signal line. The gate and the drain of the charge discharging unit 114 are connected to the reset signal line RST and the signal line 103, respectively. The drain and the source of the amplification unit 116 are connected to the signal line 103 and the drain of the selection unit 117, respectively. The gate and the source of the selection unit 117 are connected to the SEL and the signal line 102, respectively.

The photoelectric conversion unit 111 is configured to generate a charge according to the amount of emitted light and store the generated charge. The photoelectric conversion unit 111 is constituted by a photodiode.

The charge transfer unit 113 is controlled through the transfer signal line TR and configured to transfer the charge generated by the photoelectric conversion unit 111 to the charge holding unit 115. The charge transfer unit 113 electrically connects the photoelectric conversion unit 111 and the charge holding unit 115 to transfer the charge.

The charge holding unit 115 is configured to hold the charge transferred by the charge transfer unit 113. The charge holding unit 115 is constituted by so-called floating diffusion formed in a diffusion region of the semiconductor chip.

The charge discharging unit 114 is controlled through the reset signal line RST and configured to discharge the charge held by the charge holding unit 115. The charge discharging unit 114 electrically connects the charge holding unit 115 and the signal line 103 to discharge the charge.

The overflow drain 112 is configured to discharge the charge excessively generated by the photoelectric conversion unit 111. The overflow drain 112 also electrically connects the photoelectric conversion unit 111 and the power supply voltage Vdd to further discharge the charge stored in the photoelectric conversion unit 111. In this case, the overflow drain 112 is controlled through the overflow drain control signal line OFD.

The amplification unit 116 is configured to output, to the source, a voltage according to the charge held by the charge holding unit 115. In addition, the selection unit 117 is controlled through the select signal line SEL, and the voltage of the source of the amplification unit 116 is output to the signal line 102 when the selection unit 117 is electrically connected.

Operation in Pixel

When an ON signal is input from the overflow drain control signal line OFD, the overflow drain 112 is electrically connected, and the power supply voltage Vdd is applied to the cathode of the photoelectric conversion unit 111. As a result, the charge stored in the photoelectric conversion unit 111 is discharged, and the pixel 110 is initialized, that is, reset. Subsequently, a charge according to the amount of exposure is newly generated and stored in the photoelectric conversion unit 111. That is, the exposure is started.

After a lapse of a predetermined exposure time, an ON signal is input from the reset signal line RST to electrically connect the charge discharging unit 114, and the power supply voltage Vdd is applied to the charge holding unit 115. As a result, the charge based on dark current stored in the charge holding unit 115 is discharged. In this case, the amplification unit 116 generates a signal based on the charge stored in the charge holding unit 115.

Next, when an ON signal is input from the select signal line SEL, the selection unit 117 is electrically connected, and the signal generated by the amplification unit 116 is output to the signal line 102. The signal is a signal generated in the state that the charge is discharged, and the signal is in accordance with a reset voltage as a standard of the image signal described above. Hereinafter, the signal will be referred to as a reset signal.

While the selection unit 117 is electrically connected, the charge discharging unit 114 is electrically disconnected. Subsequently, an ON signal is input from the transfer signal line TR to electrically connect the charge transfer unit 113. As a result, the photoelectric conversion unit 111 and the charge holding unit 115 are electrically connected, and the charge stored in the photoelectric conversion unit 111 is transferred to the charge holding unit 115. In addition, the amplification unit 116 generates a signal according to the charge transferred to the charge holding unit 115.

Next, when an ON signal is input from the select signal line SEL, the selection unit 117 is electrically connected, and the signal generated by the amplification unit 116 is output to the signal line 102. The signal is equivalent to an image signal according to the light entering the solid-state imaging apparatus 10.

The reset signal and the image signal output from the pixel 110 as a result of the operations are processed by the horizontal transfer unit 300. Specifically, the reset signal is subtracted from the image signal to remove the difference in each pixel 110. Such a scheme is a scheme called correlated double sampling (CDS), and the scheme is widely used in imaging apparatuses.

In this way, the pixel 110 operates based on the low ground potential Vss that is a potential lower than the ground potential GND. More specifically, the substantial power supply voltage of the pixel 110 is a voltage from the low ground potential Vss to the power supply voltage Vdd. Therefore, the photoelectric conversion unit 111 generates an image signal in this range of voltage. Compared to the horizontal transfer unit 300 and the like that operate based on the ground potential GND and that are provided with the power supply voltage Vdd, the dynamic range of the photoelectric conversion unit 111 can be wide.

Configuration of Horizontal Transfer Unit

Figure 3:
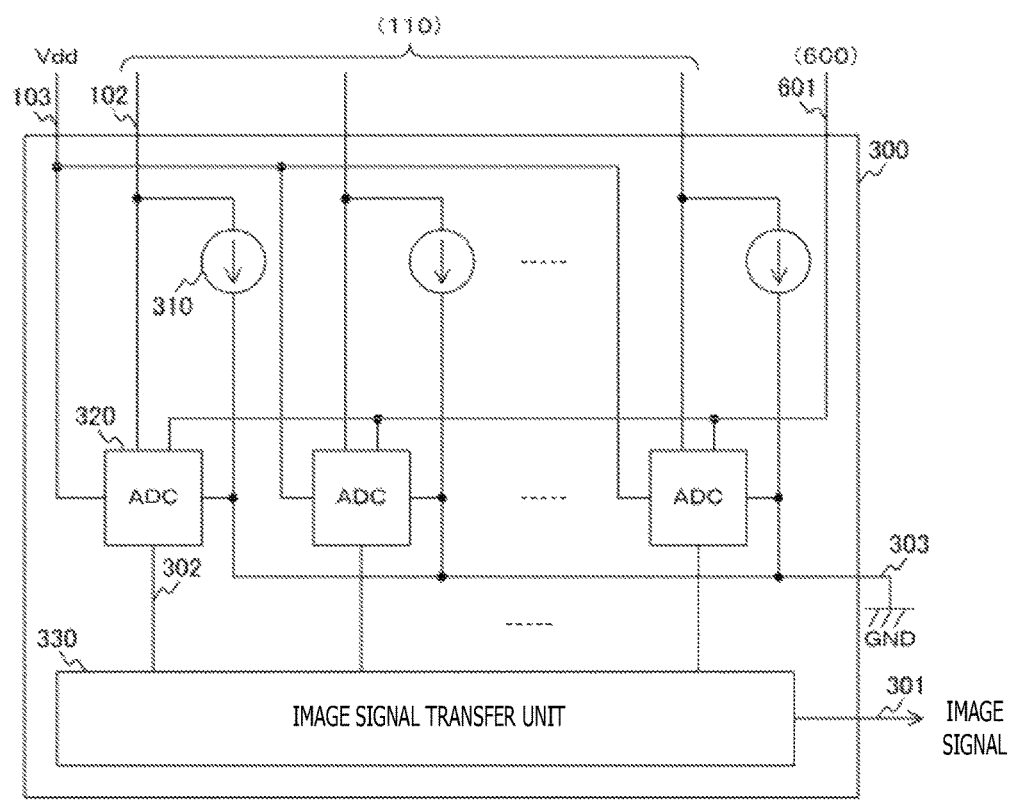
FIG. 3 is a diagram depicting a configuration example of a horizontal transfer unit 300 according to the first embodiment of the present technique.

FIG. 3 is a diagram depicting a configuration example of the horizontal transfer unit 300 according to the first embodiment of the present technique. The horizontal transfer unit 300 includes constant current power supplies 310, analog-digital converters (ADCs) 320, and an image signal transfer unit 330.

The signal line 102 is connected to one end of the constant current power supply 310 and to the input of the analog-digital converter 320. The other end of the constant current power supply 310 is connected to the second ground line 303. The output of the analog-digital converter 320 is connected to the input of the image signal transfer unit 330. Note that the analog-digital converter 320 and the image signal transfer unit 330 are connected through the signal line 302.

The constant current power supply 310 is configured to operate as a load of the amplification unit 116 described in FIG. 2. That is, the constant current power supply 310 constitutes a source follower circuit along with the amplification unit 116.

The analog-digital converter 320 is configured to convert an analog image signal output from the pixel 110 into a digital image signal and output the digital image signal. The conversion is performed based on a reference voltage. Here, the reference voltage is a voltage as a standard for converting the analog image signal into the digital image signal. The same reference voltage is input to all the analog-digital converters 320 in FIG. 3. The analog-digital converter 320 also executes the CDS process described above. The power supply voltage Vdd is applied to the analog-digital converter 320 through the signal line 103, and the analog-digital converter 320 is grounded to the ground potential GND through the second ground line 303. Details of the configuration of the analog-digital converter 320 will be described later.

The image signal transfer unit 330 is configured to transfer, in the horizontal direction, the digital image signals output by the plurality of analog-digital converters 320. Specifically, the image signal transfer unit 330 outputs the image signals to the signal line 301 in order from the image signal output by the analog-digital converter 320 arranged on the far left of FIG. 3.

Configuration of Analog-Digital Converter

Figure 4:
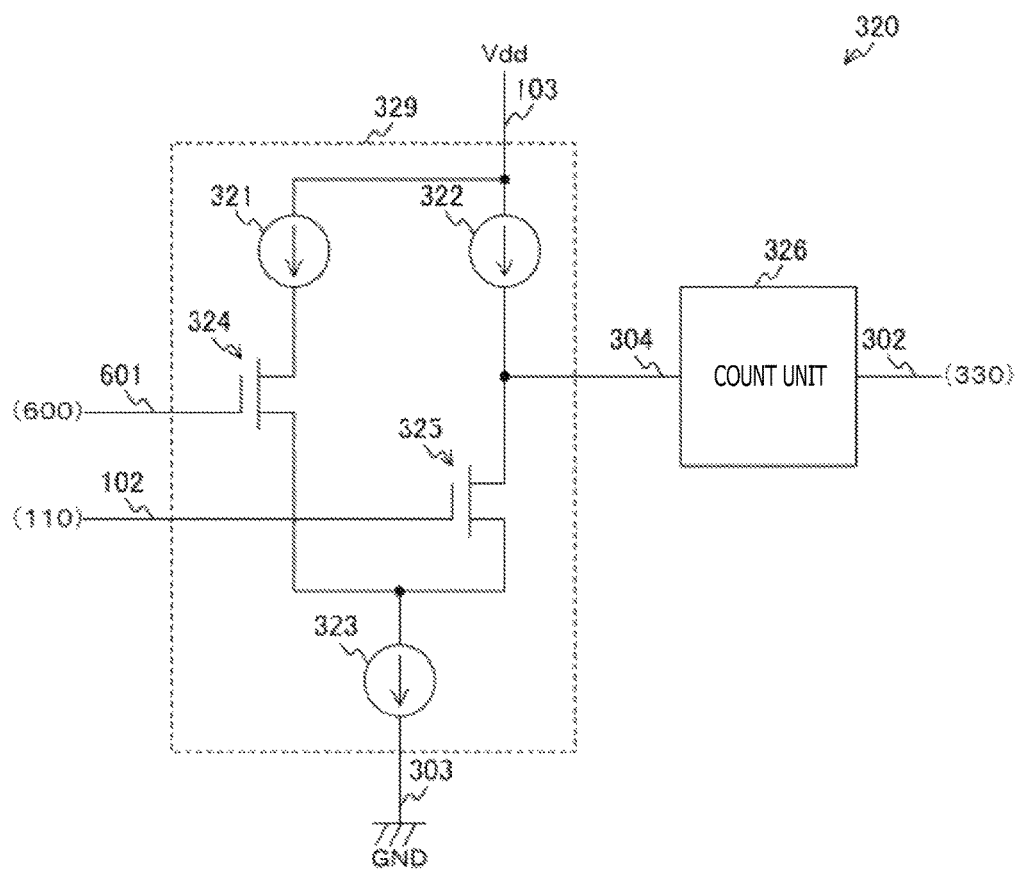
FIG. 4 is a diagram depicting a configuration example of an analog-digital converter 320 according to the first embodiment of the present technique.

FIG. 4 is a diagram depicting a configuration example of the analog-digital converter 320 according to the first embodiment of the present technique. The analog-digital converter 320 of FIG. 4 includes a comparison unit 329 and a count unit 326.

The comparison unit 329 is configured to compare the analog image signal and the reference voltage to detect coincidence between the analog image signal and the reference voltage. The comparison unit 329 includes constant current power supplies 321 to 323 and N-channel MOS transistors 324 and 325.

One end of each of the constant current power supplies 321 and 322 is connected to the signal line 103, and the other ends are individually connected to the drains of the N-channel MOS transistors 324 and 325. The gates of the N-channel MOS transistors 324 and 325 are individually connected to the signal lines 601 and 102. Furthermore, the sources of the N-channel MOS transistors 324 and 325 are connected to one end of the constant current power supply 323, and the other end of the constant current power supply is connected to the second ground line 303. The input of the count unit 326 is connected to the drain of the N-channel MOS transistor 325, and the output of the count unit 326 is connected to the signal line 302.

The N-channel MOS transistors 324 and 325 as well as the constant current power supplies 321 to 323 constitute a differential amplifier which compares the image signal and the reference voltage input to the gates of the N-channel MOS transistors 324 and 325. The result of the comparison is output from the drain of the N-channel MOS transistor 325. For example, when the reference voltage is higher than the voltage of the image signal, the potential of the drain of the N-channel MOS transistor 325 becomes a high level (H level). When the state shifts to a state in which the reference voltage is lower than the voltage of the image signal, the potential of the drain of the N-channel MOS transistor 325 makes a transition to a low level (L level). The transition occurs at the time that the reference voltage and the voltage of the image signal are substantially equal. As a result, the comparison unit 329 can detect that the reference voltage and the voltage of the image signal are substantially equal and can output it to the count unit 326. The output of the comparison unit 329 is output to the count unit 326 through the signal line 304.

The count unit 326 is a counter configured to start counting in accordance with the start of the comparison by the comparison unit 329 and stop counting in accordance with the detection of the coincidence between the reference signal and the image signal by the comparison unit 329. The count value is output as a result of the AD conversion. The count unit 326 performs both up-counting and down-counting to perform the CDS. Details of the operation of the count unit 326 will be described later.

Configuration of Reference Voltage Generation Unit

FIG. 5 is a diagram depicting a configuration example of the reference voltage generation unit 500 according to the first embodiment of the present technique. The reference voltage generation unit 500 includes a count unit 510, a digital-analog converter (DAC) 520, and a resistor 530.

The count unit 510 is a counter that generates a digital reference voltage. The count unit 510 down-counts a digital value equivalent to the reference voltage to generate a reference voltage in a ramp shape.

The digital-analog converter 520 is configured to convert the digital reference voltage generated by the count unit 510 into an analog reference current. The digital-analog converter 520 converts the reference voltage input as a digital value into an analog value and outputs the analog value as a current. That is, the digital-analog converter 520 converts the digital signal into the analog signal and converts the voltage into the current.

The resistor 530 is configured to convert the current output from the digital-analog converter 520 into a voltage. The resistor 530 is connected between the output of the digital-analog converter 520 and the second ground line 303. The output current of the digital-analog converter 520 flows in the ground line 303 through the resistor 530, and the output current is converted into a reference voltage Vramp and output to the signal line 501.

The count unit 510 starts to down-count a set initial value according to control by a control unit (not depicted). In synchronization with this, the comparison operation and the counting by the comparison unit 329 and the count unit 326 in the analog-digital converter 320 described above are started.

Analog-Digital Conversion Operation

Figure 6:
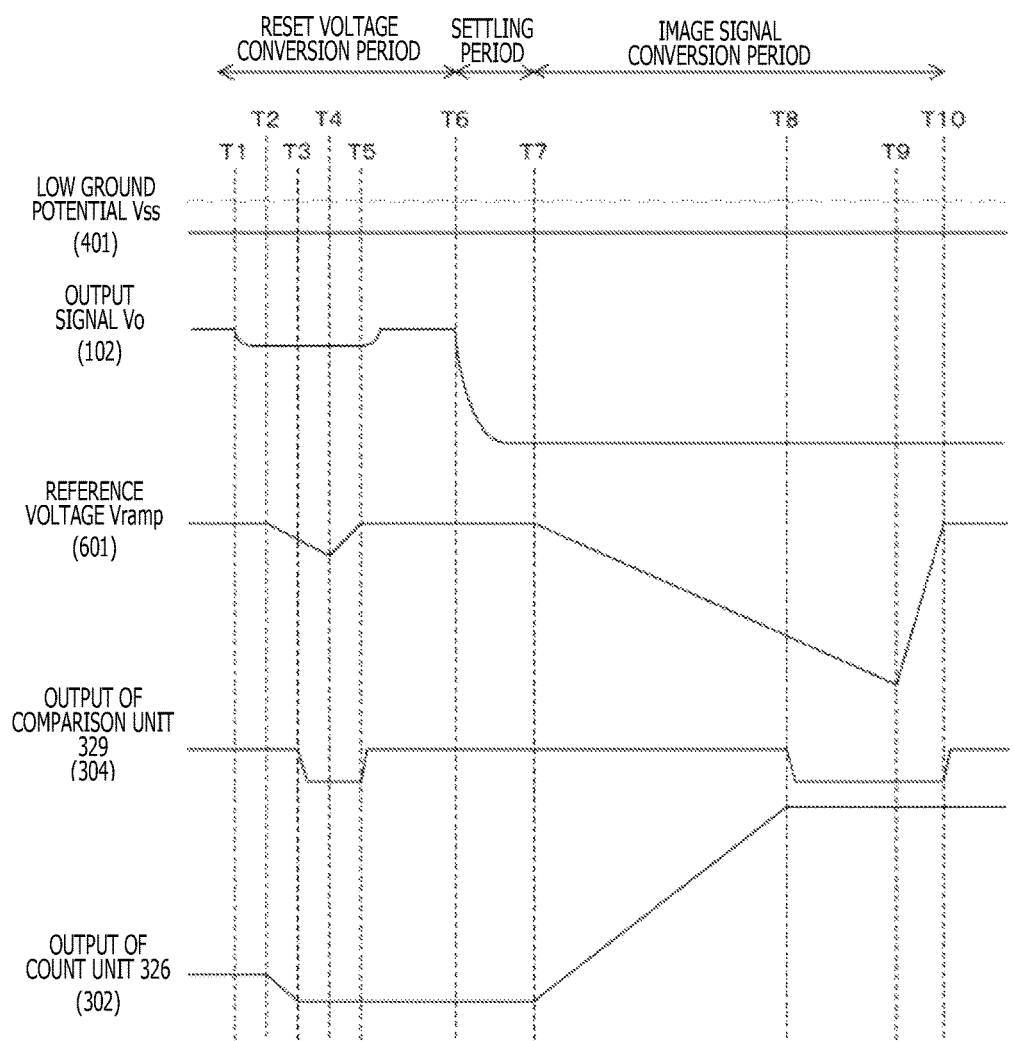
FIG. 6 is a diagram depicting an example of an analog-digital (AD) conversion operation according to the first embodiment of the present technique.

FIG. 6 is a diagram depicting an example of an AD conversion operation according to the first embodiment of the present technique. FIG. 6 illustrates the AD conversion by the analog-digital converter 320. FIG. 6 also illustrates a relationship between the output signal Vo of the pixel 110 input to the analog-digital converter 320, the reference voltage Vramp, the output of the comparison unit 329, the output of the count unit 326, and the low ground potential Vss. In FIG. 6, a dotted line depicted over the waveform of the low ground potential Vss indicates a potential of 0 V. In addition, the AD conversion operation illustrated in FIG. 6 is started along with the output of the reset signal from the pixel 110 described above.

Reset Voltage Conversion Period: T1 to T5

First, the reset signal is output as the output signal Vo from the pixel 110 (T1). After the reset signal has stabilized, the count unit 510 of the reference voltage generation unit 500 starts the down-counting, and the reference voltage Vramp drops in a ramp shape, that is, drops linearly. At the same time, the count unit 326 starts the down-counting (T2). Subsequently, when the output signal Vo and the reference voltage Vramp coincide, the output of the comparison unit 329 makes a transition from the H level to the L level. As a result, the count unit 326 stops the down-counting (T3). The count unit 510 continues the down-counting, and after a lapse of a predetermined period, stops the down-counting (T4). Subsequently, the count unit 510 is initialized, and the output of the comparison unit 329 makes a transition from the L level to the H level (T5). On the other hand, the count unit 326 holds the count value. As a result, the count unit 326 holds a digital value equivalent to the reset voltage.

Settling Period: T6

Next, the image signal is output as the output signal Vo from the pixel 110 (T6). Subsequently, the operation waits until Vo becomes stable.

Image Signal Conversion Period: T7 to T10

After the settling period, the down-counting by the count unit 510 is started, and the reference voltage Vramp drops in a ramp shape again. At the same time, the count unit 326 starts the up-counting (T7). Subsequently, Vo and the reference voltage Vramp coincide, and the output of the comparison unit 329 makes a transition from the H level to the L level. As a result, the count unit 326 stops the up-counting (T8). The count unit 510 continues the down-counting, and after a lapse of a predetermined period, stops the down-counting (T9). Subsequently, the count unit 510 is initialized, and the output of the comparison unit 329 makes a transition from the L level to the H level (T10). On the other hand, the count unit 326 holds the count value. The image signal transfer unit 330 horizontally transfers the count value as an AD-converted image signal.

In this way, the AD conversion of the image signal is performed. In addition, the count unit 326 holds the reset voltage through the down-counting performed in the reset voltage conversion period. In the image signal conversion period, the held count value can be up-counted to subtract the reset voltage from the image signal. In this way, the CDS is executed.

Change in Low Ground Potential

FIG. 7 is a diagram depicting a change in the low ground potential according to the first embodiment of the present technique. FIG. 7 is a diagram illustrating a relationship between signals and the like of the pixel 110, the constant current power supply 310 and the analog-digital converter 320 of the horizontal transfer unit 300, the ground potential generation unit 400, the reference voltage generation unit 500, and the reference voltage correction unit 600. For the convenience, the ground potential generation unit 400 is constituted by a negative voltage power supply 402 and a capacitor 403 connected in parallel in the example illustrated in FIG. 7.

The voltage of the low ground potential Vss generated by the ground potential generation unit 400 changes due a load fluctuation when Vo is output from the pixel 110. The voltage also changes due to noise generated along with the operation of the negative voltage power supply 402. Usually, the capacitor 403 reduces the changes in the low ground potential Vss. However, when a low-volume capacitor 403 is connected to downsize the system, the change (ΔVss) in the low ground potential Vss becomes large. Since ΔVss is superimposed on the ground line of the pixel 110, the output signal Vo is affected and changed by an amount ΔVo. Therefore, the reference voltage correction unit 600 corrects the reference voltage. Specifically, ΔVss is detected, and a voltage equivalent to ΔVo is superimposed on the reference voltage. As a result, ΔVo is canceled, and the fluctuation in the image signal after the AD conversion can be reduced.

Correction of Reference Voltage

Figure 8:
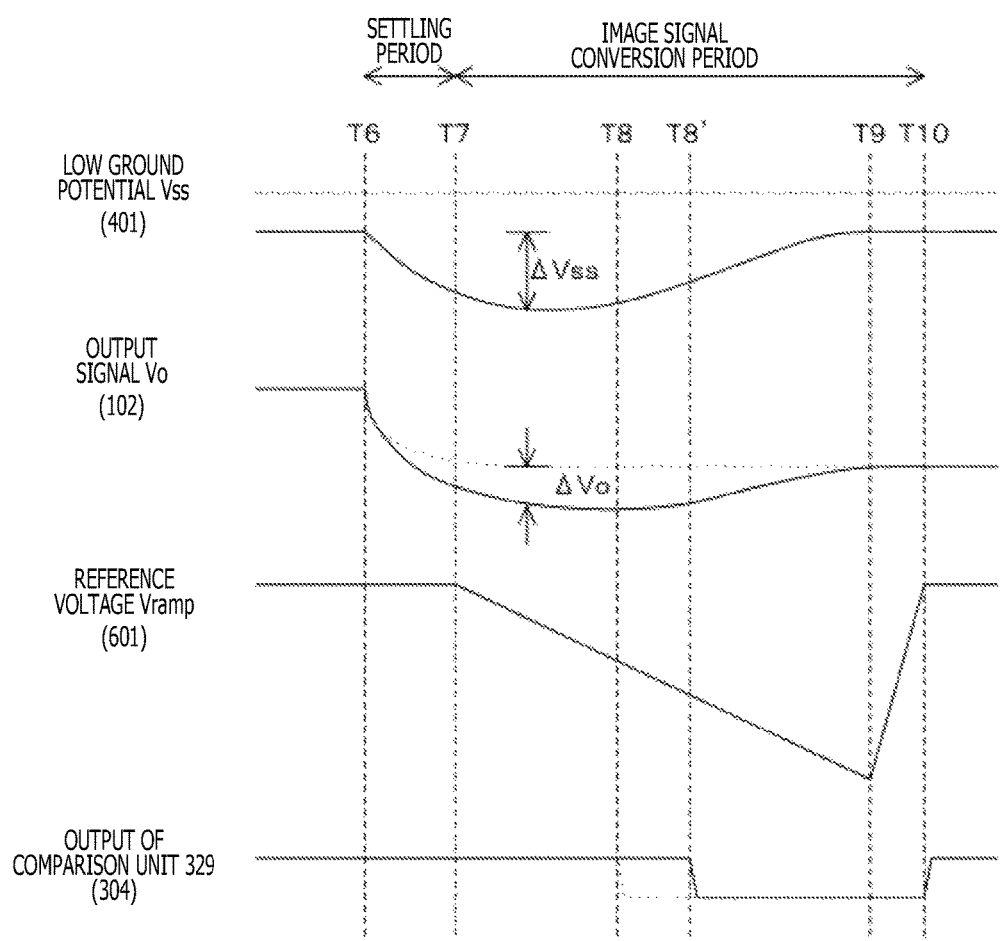
FIG. 8 is a diagram depicting a reference voltage before correction according to the first embodiment of the present technique.

FIG. 8 is a diagram depicting the reference voltage before the correction according to the first embodiment of the present technique. FIG. 8 illustrates a relationship between the output signal Vo, the reference voltage Vramp before the correction, the output of the comparison unit 329, and the low ground potential Vss. Note that dotted lines depicted over the waveforms of the reference voltage Vramp and the output of the comparison unit 329 indicate waveforms when the output signal Vo has not changed. As illustrated in FIG. 8, the low ground potential Vss is changed by the amount ΔVss, and this changes the output signal Vo by the amount ΔVo. Since Vo and the reference voltage Vramp before the correction are compared, the time that the output of the comparison unit 329 makes a transition from the H level to the L level changes from T8 to T8', and an error occurs in the AD-converted image signal.

Figure 9:
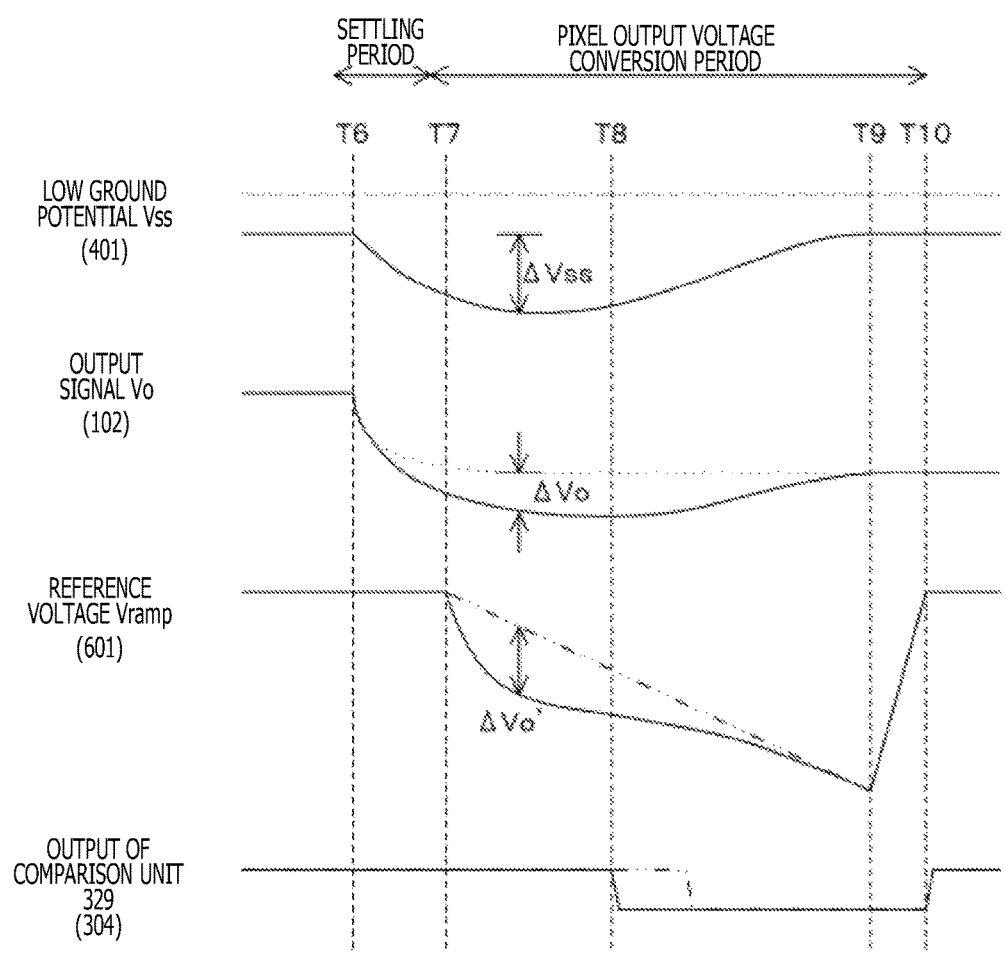
FIG. 9 is a diagram depicting the reference voltage after the correction according to the first embodiment of the present technique.

FIG. 9 is a diagram depicting the reference voltage after the correction according to the first embodiment of the present technique. Compared to FIG. 8, the reference voltage Vramp is corrected by an amount ΔVo'. Note that two-dot chain lines depicted over the waveforms of the reference voltage Vramp and the output of the comparison unit 329 are lines indicating the waveforms in FIG. 8 for comparison. In this way, the reference voltage Vramp can be corrected to reduce the fluctuation in the AD-converted image signal.

Configuration of Reference Voltage Correction Unit

FIG. 10 depicts diagrams illustrating the reference voltage correction unit 600 according to the first embodiment of the present technique. The reference voltage correction unit 600 in a of FIG. 10 includes constant current power supplies 602 and 609, an N-channel MOS transistor 608, P-channel MOS transistors 606 and 607, resistors 603 to 605, and a capacitor 611.

The sources of the P-channel MOS transistors 606 and 607 are connected to the signal line 103. The drain of the P-channel MOS transistor 606 is connected to the gate of the P-channel MOS transistor 607 and the drain of the N-channel MOS transistor 608. The drain of the P-channel MOS transistor 607 is connected to one end of the constant current power supply 609, and the other end of the constant current power supply 609 is connected to the second ground line 303. The source of the N-channel MOS transistor 608 is connected to one end of the resistor 605, and the other end of the resistor 605 is connected to the second ground line 303. One end of the constant current power supply 602 is connected to the signal line 103, and the other end is connected to one end of each of resistors 603 and 604. The other ends of the resistors 603 and 604 are individually connected to the second ground line 303 and the gate of the N-channel MOS transistor 608. The capacitor 611 is connected between the gate of the N-channel MOS transistor 608 and the first ground line 401. Note that the signal lines 501 and 601 are connected in common in the reference voltage correction unit 600, and the drain of the P-channel MOS transistor 607 is connected to the signal lines 501 and 601.

The capacitor 611 is a coupling capacitor and is configured to input the amount of change ΔVss in the low ground potential Vss to the gate of the N-channel MOS transistor 608. The N-channel MOS transistor 608 and the resistor 605 constitute an amplifier circuit that amplifies ΔVss and converts ΔVss into an amount of change (ΔId) in a drain current Id. The constant current power supply 602, the resistor 603, and the resistor 604 form a bias circuit that supplies a bias voltage to the gate of the N-channel MOS transistor 608. The P-channel MOS transistors 606 and 607 constitute a current mirror circuit which supplies a current equivalent to Id to the signal lines 501 and 601. The constant current power supply 609 is a drain load of the P-channel MOS transistor 607. The difference between the current flowing in the constant current power supply 609 and Id is the current supplied to the signal lines 501 and 601. The P-channel MOS transistors 606 and 607 as well as the constant current power supply 609 constitute a correction circuit that corrects the reference voltage.

At steady state, the drain current Id set by the bias circuit flows in the N-channel MOS transistor 608. The Id and the current value of the constant current power supply 609 are set to the same value. As a result, the current flowing from the reference voltage correction unit 600 to the signal lines 501 and 601 is 0 A at steady state.

When the low ground potential Vss drops, the amplifier circuit amplifies the amount of change (ΔVss), and Id is reduced. A current equivalent to the reduction in Id flows from the signal lines 501 and 601 to the constant current power supply 609. Therefore, the current flowing in the resistor 530 described in FIG. 5 decreases, and the reference voltage Vramp also drops.

In FIG. 10, b illustrates another example of the reference voltage correction unit 600. The reference voltage correction unit 600 includes constant current power supplies 622 and 629, an amplifier 624, P-channel MOS transistors 626 and 627, resistors 623 to 625, and a capacitor 631.

Since the reference voltage correction unit 600 is equivalent to a circuit in which the amplification unit including the N-channel MOS transistor 608 and the resistor 605 in a of FIG. 10 is replaced with a voltage current conversion circuit including the amplifier 624 and the resistor 625, the reference voltage correction unit 600 will not be described.

Reference Voltage Correction Process

Figure 11:
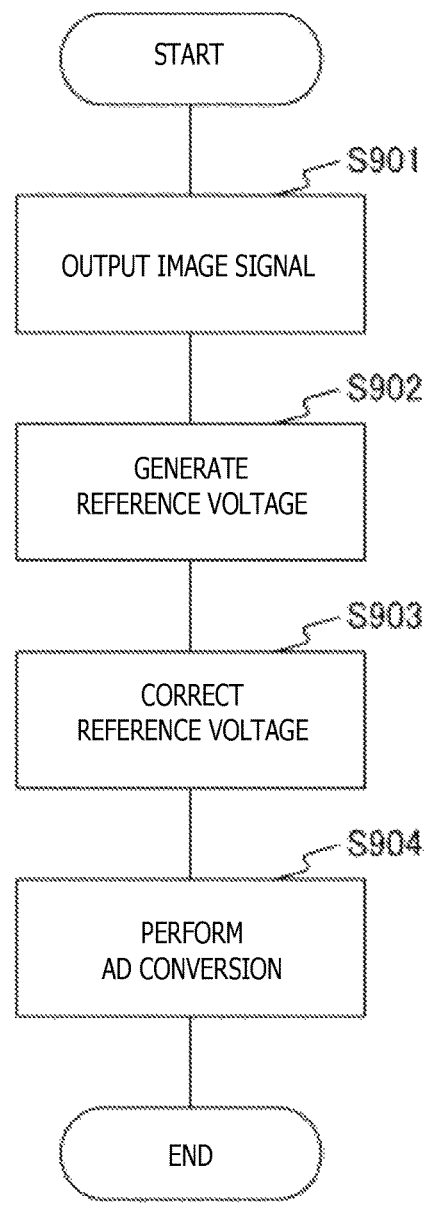
FIG. 11 is a diagram depicting an example of a processing procedure of a reference voltage correction process according to the first embodiment of the present technique.

FIG. 11 is a diagram depicting an example of a processing procedure of a reference voltage correction process according to the first embodiment of the present technique. First, the pixel 110 outputs an image signal to the horizontal transfer unit 300 (step S901). Next, the reference voltage generation unit 500 generates a reference voltage (step S902). Next, the reference voltage correction unit 600 corrects the reference voltage (step S903). Lastly, the analog-digital converter 320 performs AD conversion of the image signal based on the corrected reference voltage (step S904).

In this way, in the first embodiment of the present technique, the reference voltage Vramp is corrected according to the change in the low ground potential Vss applied to the pixel, and the AD conversion of the image signal is performed based on this. Therefore, the fluctuation in the image signal after the AD conversion can be reduced when the image signal fluctuates due to a change in the low ground potential Vss.

2. Second Embodiment

In the embodiment described above, the ground potential generation unit 400 constantly generates the low ground potential Vss. On the other hand, the operation of the ground potential generation unit 400 is stopped in a period of the AD conversion of the image signal in a second embodiment of the present technique. This reduces the effect of the noise generated by the ground potential generation unit 400.

Configuration of Solid-State Imaging Apparatus

Figure 12:
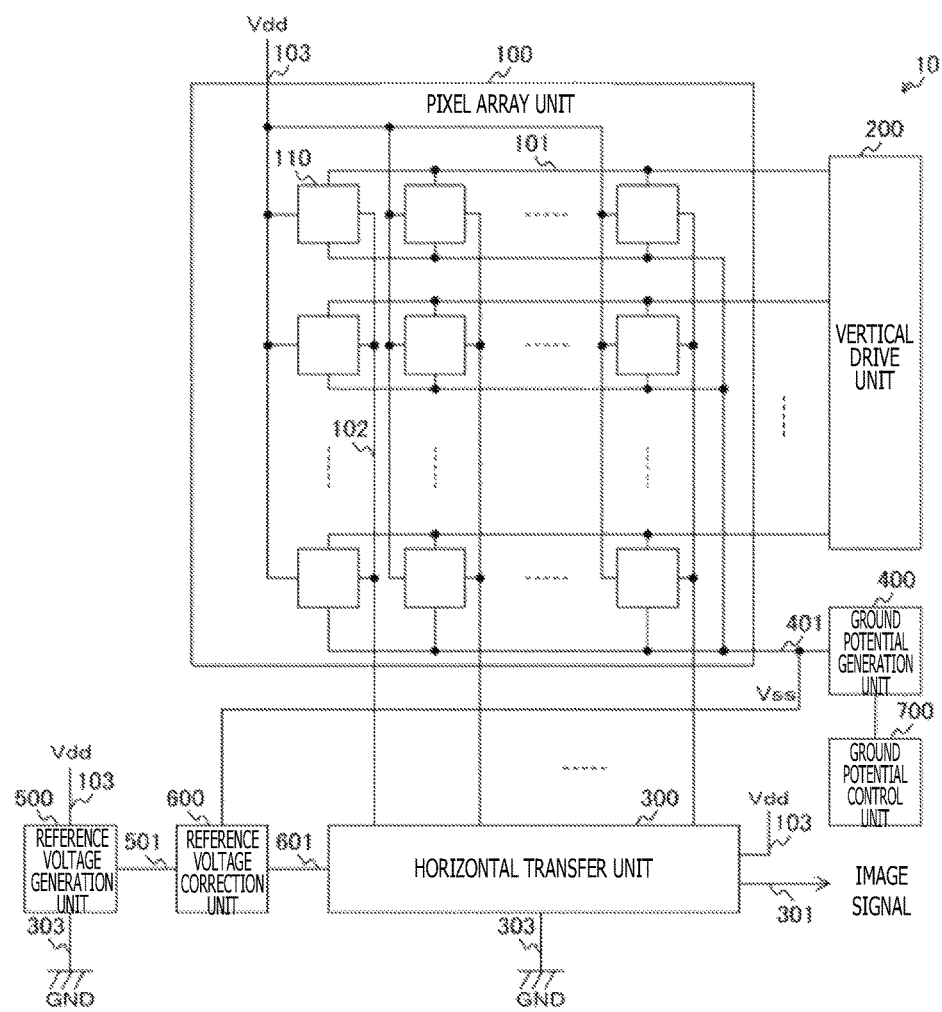
FIG. 12 is a diagram depicting a configuration example of a solid-state imaging apparatus 10 according to a second embodiment of the present technique.

FIG. 12 is a diagram depicting a configuration example of a solid-state imaging apparatus 10 according to the second embodiment of the present technique. The solid-state imaging apparatus 10 includes a ground potential control unit 700, and this is the difference from the solid-state imaging apparatus 10 described in FIG. 1.

The ground potential control unit 700 is configured to control the ground potential generation unit 400. The ground potential control unit 700 stops the generation of the low ground potential Vss by the ground potential generation unit 400 in the period in which the analog-digital converter 320 of the horizontal transfer unit 300 performs the AD conversion.

The ground potential generation unit 400 generates the low ground potential Vss based on the control by the ground potential control unit 700.

As described above, the ground potential generation unit 400 is constituted by the switching regulator and the like.

Therefore, noise is generated along with the generation of the low ground potential Vss. The noise is superimposed on the image signal after the AD conversion, and the image quality is reduced. Therefore, in the second embodiment of the present technique, the ground potential generation unit 400 is stopped in the period in which the analog-digital converter 320 performs the AD conversion, thereby reducing the noise and preventing the reduction in the image quality. However, the low ground potential Vss is not supplied in the period in which the ground potential generation unit 400 is stopped, and the low ground potential Vss gradually drops (approaches 0 V). Since the image signal is affected by the change in the low ground potential Vss, the reference voltage correction unit 600 corrects the reference voltage.

The other configuration of the solid-state imaging apparatus 10 is similar to the configuration of the solid-state imaging apparatus 10 described in FIG. 1, and the description will be omitted.

Correction of Reference Voltage

Figure 13:
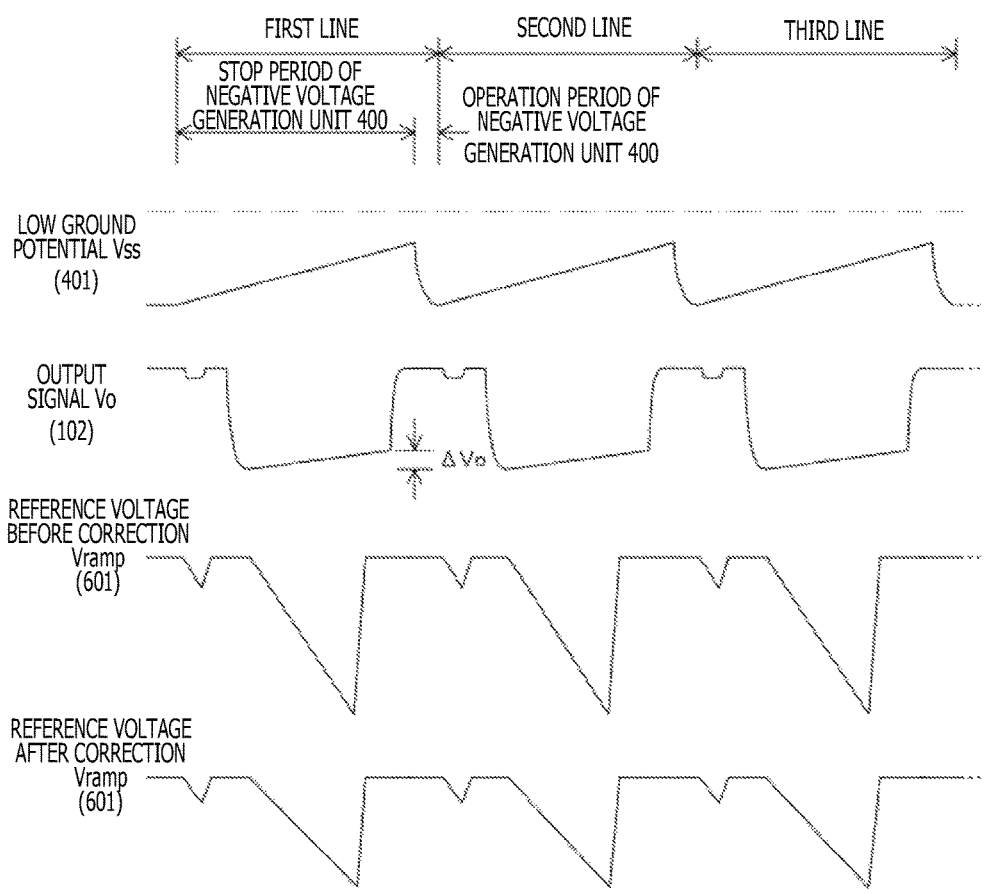
FIG. 13 is a diagram depicting correction of a reference voltage according to the second embodiment of the present technique.

FIG. 13 is a diagram depicting correction of the reference voltage according to the second embodiment of the present technique. FIG. 13 illustrates a relationship between the low ground potential Vss, the output signal Vo, the reference voltage Vramp before the correction, and the reference voltage Vramp after the correction. The ground potential control unit 700 controls the ground potential generation unit 400 to stop the generation of the low ground potential Vss in the period in which the analog-digital converter 320 performs the AD conversion. After the AD conversion by the analog-digital converter 320 is finished, the ground potential control unit 700 controls the ground potential generation unit 400 to restart the generation of the low ground potential Vss. The ground potential control unit 700 repeats the control in each line to intermittently operate the ground potential generation unit 400. Therefore, the low ground potential Vss of FIG. 13 changes in the period in which the ground potential generation unit 400 stops the operation. Due to the effect of the change, the output signal Vo is changed by the amount ΔVo. Therefore, the reference voltage correction unit 600 corrects the reference voltage. As illustrated in FIG. 13, the reference voltage Vramp can be corrected according to the amount of change ΔVo to reduce the fluctuation in the image signal after the AD conversion.

In this way, in the second embodiment of the present technique, the operation of the ground potential generation unit 400 is stopped, and the reference voltage is corrected in the period of the AD conversion. As a result, the noise of the image signal can be reduced, and the reduction in the image quality can be prevented.

3. Third Embodiment

In the first embodiment described above, the pixel array unit and the other parts are formed on the same semiconductor chip. On the other hand, the pixel array unit and the other parts are formed on different semiconductor chips in a third embodiment of the present technique. As a result, the low ground potential Vss and the ground potential GND can be easily separated.

Configuration of Solid-State Imaging Apparatus

FIG. 14 is a diagram depicting a configuration example of a solid-state imaging apparatus 10 according to the third embodiment of the present technique. The solid-state imaging apparatus 10 includes a pixel array chip 810 and a peripheral circuit chip 820.

The pixel array chip 810 is a semiconductor chip provided with the pixel array unit 100. That is, the pixel array chip 810 is a semiconductor chip provided with the circuits and the like that operate based on the low ground potential Vss. The pixel array unit 100 is formed in a well region 811 of the pixel array chip 810. The first ground line 401 is connected to the well region 811, and the pixel array unit 100 is grounded to the low ground potential Vss.

The peripheral circuit chip 820 is a chip provided with the vertical drive unit 200, the horizontal transfer unit 300, the reference voltage generation unit 500, the reference voltage correction unit 600, and the ground potential generation unit 400. The peripheral circuit chip is a semiconductor chip provided with the circuits and the like that operate based on the ground potential GND. The vertical drive unit 200 and the like are formed in a well region 821 of the peripheral circuit chip 820. The second ground line 303 is connected to the well region 821, and the vertical drive unit 200 and the like are grounded to the ground potential GND.

In this way, in the solid-state imaging apparatus 10 according to the third embodiment of the present technique, the circuits and the like grounded to the low ground potential Vss and the ground potential GND are formed on different semiconductor chips. Therefore, the first ground line 401 and the second ground line for grounding to the potentials can be connected to the well region 811 and the well region 821, respectively.

Note that the configuration of the pixel array unit 100 and the like is similar to the solid-state imaging apparatus 10 described in FIG. 1, and the description will be omitted.

In this way, in the third embodiment of the present technique, the solid-state imaging apparatus 10 is constituted by the pixel array chip 810 and the peripheral circuit chip 820, and the first ground line 401 is connected to the well region of the pixel array chip 810. As a result, the low ground potential Vss and the ground potential GND can be easily separated.

As described above, the low ground potential Vss lower than the ground potential of the peripheral circuits is applied to the pixels in the embodiments of the present technique. Even when the low ground potential Vss changes, the reference voltage can be corrected to perform the AD conversion of the image signal, and the fluctuation of the image signal after the conversion can be reduced. As a result, the reduction in the image quality can be prevented.

Note that the above-mentioned embodiments illustrate examples for embodying the present technique, and the matters in the embodiments and the matters used to specify the invention in the claims correspond to each other. Similarly, the matters used to specify the invention in the claims and the matters with the same names in the embodiments of the present technique correspond to each other. However, the present technique is not limited to the embodiments, and the present technique can be embodied by applying various modifications to the embodiments without departing from the scope of the present technique.

The processing procedures described in the above-mentioned embodiments may be regarded as a method including the series of procedures, or the processing procedures may be regarded as a program for causing a computer to execute the series of procedures or as a recording medium storing the program. Examples of the recording medium that can be used include a compact disc (CD), a MiniDisc (MD), a digital versatile disc (DVD), a memory card, and a Blu-ray (registered trademark) Disc.

Note that the advantageous effects described in the present specification are illustrative only, and the advantageous effects are not limited. There may also be other advantageous effects.

Note that the present technique can also have the following configurations.

(1) A solid-state imaging apparatus including:

a pixel that operates based on a first ground potential applied to a first ground line and that outputs an analog image signal according to emitted light;

an analog-digital converter that operates based on a second ground potential applied to a second ground line, the second ground potential higher than the first ground potential, and that converts the analog image signal into a digital image signal based on a reference voltage as a standard for the conversion;

a reference voltage generation unit that operates based on the second ground potential and that generates the reference voltage; and a reference voltage correction unit that corrects the generated reference voltage according to a change in the first ground potential and that supplies the reference voltage to the analog-digital converter.

(2) The solid-state imaging apparatus according to (1), further including:

a ground potential generation unit that generates the first ground potential and that applies the first ground potential to the first ground line.

(3) The solid-state imaging apparatus according to (2), further including:

a ground potential control unit that stops the operation of generating the first ground potential by the reference voltage generation unit during the conversion by the analog-digital converter.

(4) The solid-state imaging apparatus according to any one of (1) to (3), in which the analog-digital converter includes:

a comparison unit that compares the analog image signal and the reference voltage to detect coincidence between the analog image signal and the reference voltage; and a count unit that performs counting in a period from a start of the comparison to the detection by the comparison unit and that outputs a count value as the digital image signal.

(5) The solid-state imaging apparatus according to any one of (1) to (4), in which a same power supply voltage is applied to the pixel and the analog-digital converter.

(6) The solid-state imaging apparatus according to any one of (1) to (5), further including:

a plurality of the pixels arranged in a matrix; and a plurality of the analog-digital converters that individually convert the analog image signals output from the plurality of pixels arranged in one row, in which the reference voltage correction unit supplies the same corrected reference voltage to each of the plurality of analog-digital converters.

(7) The solid-state imaging apparatus according to any one of (1) to (6), in which a semiconductor chip provided with the pixel and a semiconductor chip provided with the analog-digital converter and the reference voltage generation unit are different, and the first ground potential is applied to a well region of the semiconductor chip provided with the pixel.

(8) A driving method of a solid-state imaging apparatus, the method including:
an image signal output procedure of operating based on a first ground potential applied to a first ground line and outputting an analog image signal according to emitted light;
an analog-digital conversion procedure of operating based on a second ground potential applied to a second ground line, the second ground potential higher than the first ground potential, and converting the analog image signal into a digital image signal based on a reference voltage as a standard for the conversion;
a reference voltage generation procedure of operating based on the second ground potential and generating the reference voltage; and
a reference voltage correction procedure of correcting the generated reference voltage according to a change in the first ground potential and supplying the reference voltage to an analog-digital converter.

REFERENCE SIGNS LIST

10 Solid-state imaging apparatus
100 Pixel array unit
110 Pixel
200 Vertical drive unit
300 Horizontal transfer unit
303 Second ground line
310 Constant current power supply
320 Analog-digital converter
326, 510 Count unit
329 Comparison unit
330 Image signal transfer unit
400 Ground potential generation unit
401 First ground line
500 Reference voltage generation unit
520 Digital-analog converter
530 Resistor
600 Reference voltage correction unit
700 Ground potential control unit
810 Pixel array chip
811, 821 Well region
820 Peripheral circuit chip

What is claimed is:

1. A solid-state imaging apparatus comprising:
a pixel that operates based on a first ground potential applied to a first ground line and that outputs an analog image signal according to emitted light;
an analog-digital converter that operates based on a second ground potential applied to a second ground line, the second ground potential higher than the first ground potential, and that converts the analog image signal into a digital image signal based on a reference voltage as a standard for the conversion;
a reference voltage generation unit that operates based on the second ground potential and that generates the reference voltage; and
a reference voltage correction unit that corrects the generated reference voltage according to a change in the first ground potential and that supplies the reference voltage to the analog-digital converter.

2. The solid-state imaging apparatus according to claim 1, further comprising:
a ground potential generation unit that generates the first ground potential and that applies the first ground potential to the first ground line.

3. The solid-state imaging apparatus according to claim 2, further comprising:
a ground potential control unit that stops the operation of generating the first ground potential by the ground potential generation unit during the conversion by the analog-digital converter.

4. The solid-state imaging apparatus according to claim 1, wherein the analog-digital converter includes:
a comparison unit that compares the analog image signal and the reference voltage to detect coincidence between the analog image signal and the reference voltage; and
a count unit that performs counting in a period from a start of the comparison to the detection by the comparison unit and that outputs a count value as the digital image signal.

5. The solid-state imaging apparatus according to claim 1, wherein a same power supply voltage is applied to the pixel and the analog-digital converter.

6. The solid-state imaging apparatus according to claim 1, further comprising:
a plurality of the pixels arranged in a matrix; and
a plurality of the analog-digital converters that individually convert the analog image signals output from the plurality of pixels arranged in one row, wherein the reference voltage correction unit supplies the same corrected reference voltage to each of the plurality of analog-digital converters.

7. The solid-state imaging apparatus according to claim 1, wherein a semiconductor chip provided with the pixel and a semiconductor chip provided with the analog-digital converter and the reference voltage generation unit are different, and the first ground potential is applied to a well region of the semiconductor chip provided with the pixel.

8. A driving method of a solid-state imaging apparatus, the method comprising:
an image signal output procedure of operating based on a first ground potential applied to a first ground line and outputting an analog image signal according to emitted light;
an analog-digital conversion procedure of operating based on a second ground potential applied to a second ground line, the second ground potential higher than the first ground potential, and converting the analog image signal into a digital image signal based on a reference voltage as a standard for the conversion;
a reference voltage generation procedure of operating based on the second ground potential and generating the reference voltage; and
a reference voltage correction procedure of correcting the generated reference voltage according to a change in the first ground potential and supplying the reference voltage to an analog-digital converter.

* * * * *